United States Patent
Oh et al.

(10) Patent No.: US 6,530,244 B1
(45) Date of Patent: *Mar. 11, 2003

(54) OPTICAL FIBER PREFORM HAVING OH BARRIER AND FABRICATION METHOD THEREOF

(75) Inventors: Sung-Koog Oh, Kumi (KR); Man-Seok Seo, Suwon (KR)

(73) Assignee: SamSung Electronics Co., Ltd., Kyungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,084

(22) Filed: Jan. 28, 2000

Related U.S. Application Data

(62) Division of application No. 09/344,368, filed on Jun. 25, 1999, now Pat. No. 6,280,850.

(30) Foreign Application Priority Data

Jan. 28, 1999 (KR) .......................................... 1999-2696

(51) Int. Cl.$^7$ .............................................. C03B 37/018
(52) U.S. Cl. ........................... 65/417; 65/419; 385/124; 385/127
(58) Field of Search ................................ 385/124, 127; 65/417, 419

(56) References Cited

U.S. PATENT DOCUMENTS

| | | | |
|---|---|---|---|
| 4,114,980 A | | 9/1978 | Asam et al. ................. 385/127 |
| 4,184,859 A | * | 1/1980 | Maklad ........................ 65/403 |
| 4,227,806 A | * | 10/1980 | Watkins ..................... 356/73.1 |
| 4,327,965 A | * | 5/1982 | Black .......................... 385/123 |
| 4,385,802 A | | 5/1983 | Blaszyk et al. .............. 385/127 |
| 4,447,127 A | | 5/1984 | Cohen et al. ................ 385/127 |
| 4,528,009 A | * | 7/1985 | Sarkar .......................... 65/403 |
| 4,747,663 A | | 5/1988 | Huber ......................... 385/127 |
| 5,058,976 A | * | 10/1991 | DiGiovanni et al. ........... 307/4 |
| 5,090,979 A | | 2/1992 | Le Sergent et al. ........... 65/398 |
| 5,106,402 A | * | 4/1992 | Geittner et al. ............... 216/67 |
| 5,838,866 A | | 11/1998 | Antos et al. ................. 385/127 |
| 5,942,296 A | * | 8/1999 | Oh et al. ..................... 428/34.6 |
| 6,072,929 A | * | 6/2000 | Kato et al. .................. 385/123 |
| 6,091,873 A | * | 7/2000 | Matsuo et al. .............. 385/123 |
| 6,185,353 B1 | * | 2/2001 | Yamashita et al. ......... 264/1.29 |
| 6,280,850 B1 | * | 8/2001 | Oh et al. ..................... 385/124 |
| 2002/0015570 A1 | * | 2/2002 | Simons et al. .............. 385/128 |

FOREIGN PATENT DOCUMENTS

| | | | |
|---|---|---|---|
| DE | 32 32 888 A1 | * | 3/1984 |
| JP | 59-156928 | * | 9/1984 |

* cited by examiner

Primary Examiner—Sean Vincent
(74) Attorney, Agent, or Firm—Robert E. Bushnell, Esq.

(57) ABSTRACT

An optical fiber preform and a fabrication method thereof. In the present invention, an outer OH-barrier and an inner OH-barrier free of $P_2O_5$ are deposited respectively between a substrate tube and a cladding layer and between the cladding layer and a core layer during a deposition process. In addition, a refractive index increases toward the center in the core layer.

23 Claims, 2 Drawing Sheets

OPTICAL FIBER PREFORM HAVING OH BARRIER AND FABRICATION METHOD THEREOF

CROSS-REFERENCE TO RELATED APPLICATIONS

This is a divisional of Ser. No. 09/344,368 filed on Jun. 25, 1999, now U.S. Pat. No. 6,280,850 B1, issued on Aug. 28, 2001 and assigned to the assignee of the present invention.

CLAIM OF PRIORITY

This application claims priority to an application entitled "Optical Fiber Preform Having OH Barrier and Fabrication Method Thereof" filed in the Korean Industrial Property Office on Jan. 28, 1999 and assigned Serial No. 99-2696, the contents of which are hereby incorporated by reference.

BACKGROUND OF THE INVENTION

1. Field of the Invention

The present invention relates generally to an optical fiber preform formed by MCVD (Modified Chemical Vapor Deposition), and in particular, to an optical fiber preform having an OH barrier and a fabrication method thereof.

2. Description of the Related Art

Due to the advantages of drawing a long optical fiber drawn from a unit preform, a preform should be formed with large diameter to increase the productivity of optical fiber. In fabrication of an optical, fiber preform by modified chemical vapor deposition, how thick a core layer can be deposited is a key issue to production of a large-diameter preform. In the case of a large-diameter preform, however, heat is not fully transferred to the core layer due to tube collapse and increased tube thickness during the deposition, resulting in bad sintering and consolidation of the core layer.

A single-mode optical fiber is formed by depositing a cladding layer and a core layer. For fabrication of an optical fiber preform for a DC-SM (Depressed Cladding-Single Mode) type, a cladding layer is formed by depositing $SiO_2$ (silica) doped with $P_2O_5$, $GeO_2$, and F to reduce deposition temperature and refractive index, a core layer through which light is transmitted is formed by depositing $SiO_2$ doped with $GeO_2$, and the deposited cladding layer and core layer are collapsed and closed.

In the process of fabricating an optical fiber preform by modified chemical vapor deposition, a tube self-collapses during deposition as a deposited layer becomes thicker and, as a result, the thickness of the deposited layer is further increased. A high-temperature burner is required to sinter and consolidate the thick deposited layer. The resulting long collapse and closing process leads to a long time exposure of a substrate tube to high temperature. Therefore, it is difficult to form a preform from which 300 km or longer optical fiber can be drawn.

If the preform is formed in such a way that the diameter ratio of the cladding layer to the core layer (b/a) is small, OH absorption loss is drastically increased. That is, a very small amount of moisture (generally, a few ppm) included in the substrate tube is introduced into the deposited layers and combined with $SiO_2$ or $P_2O_5$ deposited in the cladding layer, producing a P—O—H or Si—O—H bond. OH penetrated even to the core layer is combined with $SiO_2$ or $GeO_2$, releasing Si—O or Ge—O bonds and producing Si—O—H or Ge—O—H bonds, instead.

The above O—H or P—O—H bond adds to optical loss caused by an absorption band of a specific wavelength region. In the case of a single-mode optical fiber, the O—H bond significantly influences optical loss at wavelengths of 1.24 and 1.385 $\mu$m and the P—O—H bond in a wavelength region ranging from 1.2 to 1.8 $\mu$m. OH introduced into the core area forms a non-bridging oxygen (NBO). The resulting density fluctuation in the core layer increases scattering loss.

In addition, as a deposited layer becomes thicker, the inner and outer diameters of a tube decrease during sintering and consolidation simultaneous with deposition. Therefore, it is difficult to obtain an optimal diameter ratio (cladding diameter/core diameter=b/a) and thus have a thickness of a layer enough to prevent OH diffusion, resulting in a great increase of OH-caused loss.

A cladding layer may be formed to be thick to prevent penetration of OH from a substrate tube into a core layer in prior art. In fabricating a large-diameter preform using this method, however, tube contraction makes it difficult to obtain an optimal diameter ratio and the increase of tube layer thickness during deposition of a core layer reduces a heat transfer efficiency. Thus, a higher temperature burner is used and long exposure of the tube to high temperature further increases OH-caused loss.

Examples of optical fibers and preforms of the conventional art are seen in the following U.S. Patents. U.S. Pat. No. 4,114,980, to Asam et al., entitled Low Loss Multilayer Optical Fiber, describes an optical fiber made from a deposited silica tube. A barrier layer is interposed between the silica tube and the cladding layer to prevent migration of OH.

U.S. Pat. No. 4,385,802, to Blaszyk et al., entitled Long Wavelength, Low-Loss Optical Waveguide, describes an optical fiber having a core, a first inner cladding layer having $P_2O_5$, and a second inner cladding layer disposed between the first inner cladding layer and the core to prevent $P_2O_5$ from diffusing into the core.

U.S. Pat. No. 4,447,127, to Cohen et al., entitled Low Loss Single Mode Fiber, describes a double clad optical fiber.

U.S. Pat. No. 5,090,979, to Le Sergent et al., entitled Method of Manufacturing An Optical Fiber Preform Having Doped Cladding, describes a preform for an optical fiber. The preform has a support layer, a substrate layer, a core and a cladding.

U.S. Pat. No. 5,838,866 to Antos et al., entitled Optical Fiber Resistant To Hydrogen-Induced Attenuation, describes an optical fiber with a central core, an inner cladding region containing germanium dioxide, and an outer cladding region.

U.S. Pat. No. 5,942,296, to Oh et al., entitled Optical Fiber Preform, describes an optical fiber preform made from a first quartz tube used as a clad, having a deposited layer and a clad layer, and a second quartz tube jacketing the first quartz tube. Use of the first quartz tube reduces the OH concentration.

However, the inventions described in these patents do not solve the above-mentioned problems.

SUMMARY OF THE INVENTION

It is therefore an object of the present invention to provide an improved optical fiber preform.

It is also an object of the present invention to provide an improved method for manufacturing an optical fiber preform.

A further object of the invention is to provide a larger optical fiber preform.

A yet further object of the invention is to provide an optical fiber preform from which more than 300 km of optical fiber can be drawn.

A still further object of the invention is to provide an optical fiber preform and a fabrication method thereof, in which the refractive index distribution of a single-mode optical fiber drawn from the fiber is improved.

Another object of the invention is to provide an optical fiber preform yielding an optical fiber having a low diameter ratio.

Still another object of the invention is to provide an optical fiber preform yielding an optical fiber having low optical loss caused by hydroxyl.

The above objects are achieved by providing an optical fiber preform. The optical fiber preform includes a substrate tube, a cladding layer, a core layer with a refractive index greater than the refractive index of the cladding layer and having an increased value toward the center thereof, and a first barrier formed between the substrate tube and the cladding layer by depositing a material with a low OH diffusion coefficient, for preventing OH included in the substrate tube from penetrating into the cladding layer.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described hereinbelow with reference to the accompanying drawings. In the following description, well-known functions or constructions are not described in detail where they would obscure the invention in unnecessary detail.

Figure 1:
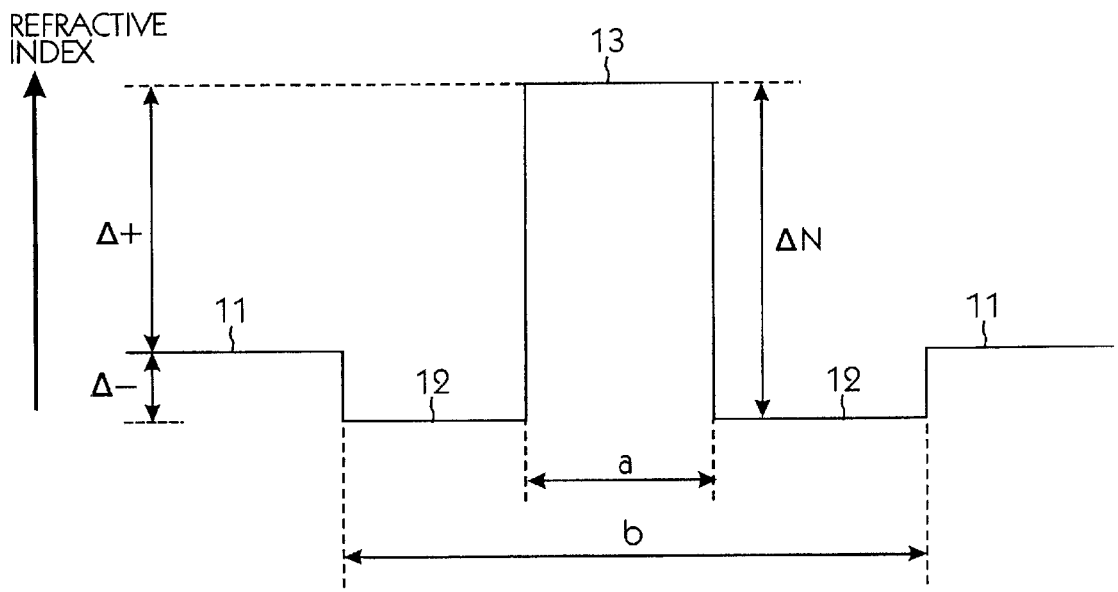
FIG. 1 illustrates a refractive index profile of a typical depressed cladding-single mode optical fiber.

FIG. 1 illustrates a refractive index profile of a typical DC-SM optical fiber. In FIG. 1, reference numeral 11 denotes a substrate tube, reference numeral 12 denotes a cladding layer, and reference numeral 13 denotes a core layer. Reference symbols Δ+ and Δ− denote the respective refractive index differences, relative to the substrate tube, of the core and cladding layers. Reference characters a and b denote the respective diameters of the core and cladding layers.

Since $P_2O_5$ deposited to form the cladding layer 12 melts at a relatively low temperature, 570° C., a process temperature can be decreased and a deposition efficiency can be increased by using the $P_2O_5$ with another material. On the other hand, the $P_2O_5$ acts as an OH-bridge which transfers OH included in the substrate tube 11 to the core layer 13 due to its large hygroscopicity, resulting in an increase in OH-caused loss in the core layer 13.

Figure 2A:
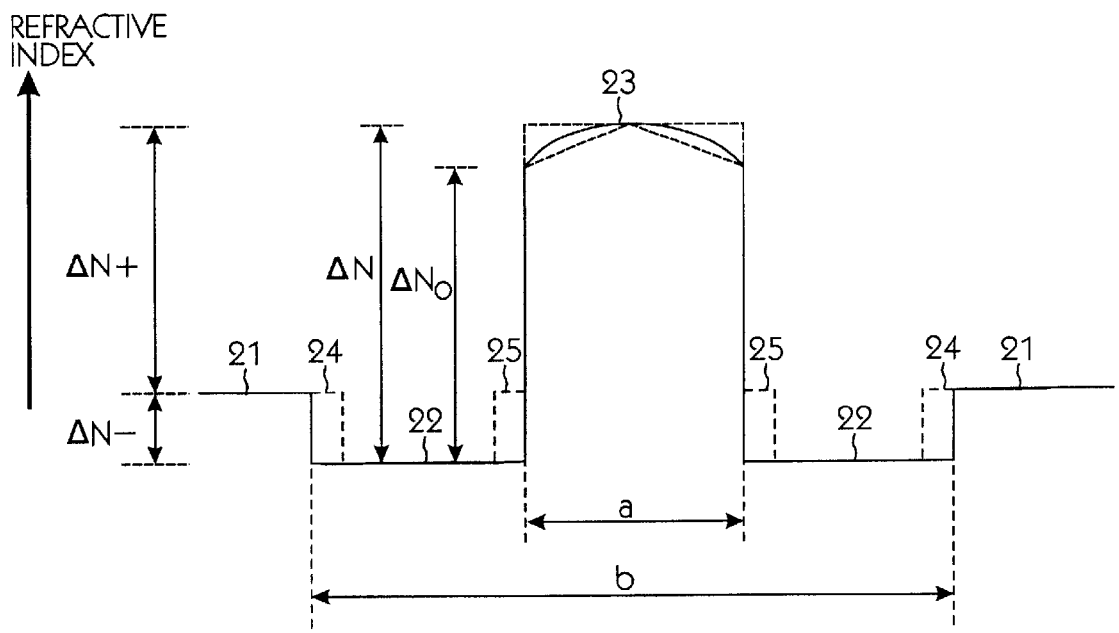
FIG. 2A illustrates a refractive index profile of a depressed cladding-single mode optical fiber according to the present invention.

FIG. 2A illustrates a refractive index profile of a DC-SM optical fiber according to the present invention. In FIG. 2A, reference numeral 21 denotes a substrate tube, reference numeral 24 denotes an outer cladding layer being a first barrier, reference numeral 22 denotes a middle cladding layer, reference numeral 25 denotes an inner cladding layer being a second barrier, and reference numeral 23 denotes a core layer. Reference symbols ΔN+ and ΔN− denote the respective refractive index differences, relative to the substrate tube 21, of the core layer 23 and the middle cladding layer 22. Reference characters a and b denote the respective diameters of the core layer 23 and the middle cladding layer 22.

As shown in FIG. 2A, an optical fiber preform according to the present invention has three cladding layers of different chemical compositions, that is, the outer cladding layer 24 as the first barrier, the middle cladding layer 22, and the inner cladding layer 25 as the second barrier.

The outer cladding layer 24 intervenes between the substrate tube 21 having a high OH concentration and the middle cladding layer 22 including $P_2O_5$ being an OH-transferring medium, for preventing OH in the substrate tube 21 from penetrating into the middle cladding layer 22. The inner cladding layer 25 is disposed between the middle cladding layer 22 and the core layer 23, for preventing OH introduced from the substrate tube 21 into the middle cladding layer 22 or OH produced by moisture included in a chemical material during deposition of the middle cladding layer 22 from penetrating into the core layer 23 being an optical waveguide area.

The OH content of a substrate tube is tens of ppb and that of a deposited silica is a few ppb. Silica is a material structurally most stable against OH among deposited chemical materials and can effectively block OH penetration at high temperature. Therefore, the outer cladding layer 24 and the inner cladding layer 25 are free of $P_2O_5$, and their refractive indexes are controlled using $SiO_2$ or $SiO_2+GeO_2$.

From a refractive index perspective, the refractive index of the core layer 23 is higher than that of the middle cladding layer 22 and increases toward the core at a predetermined rate. When an optical fiber is drawn rapidly, rapid cooling gives rise to thermal stress. Here, the refractive index of the core layer 23 increases from ΔNo at the boundary to ΔN at the center, thereby preventing optical loss and deterioration in mechanical characteristics of the optical fiber caused by the thermal stress. Hence, an optical fiber with low loss and a low diameter ratio can be obtained at high speed. For example, it is preferable that the refractive index at the periphery of the core layer 23 reaches 75 to 99% of that at the center of the core layer 23.

The refractive index of the inner and outer cladding layers 25 and 24 are adjusted to be equal or approximate to that of the middle cladding layer 22 but not greater than that of the substrate tube 21 or the core layer 23.

In general, the OH concentration of a deposited layer in a substrate tube is 1/1000 or smaller of that of the substrate tube. $P_2O_5$ is used in depositing a cladding layer to reduce a process temperature during the cladding deposition. Due to its great hygroscopicity, $P_2O_5$ acts as a bridge for transferring OH from the substrate tube to a core layer, thereby increasing OH-caused loss in the core layer. Therefore, an OH barrier doped with materials with low OH diffusion coefficients is deposited between the substrate tube with a high OH concentration and the cladding layer including the OH-transferring medium, $P_2O_5$, and between the cladding layer and the core layer in order to prevent OH diffusion from the tube to the core layer.

Figure 2B:
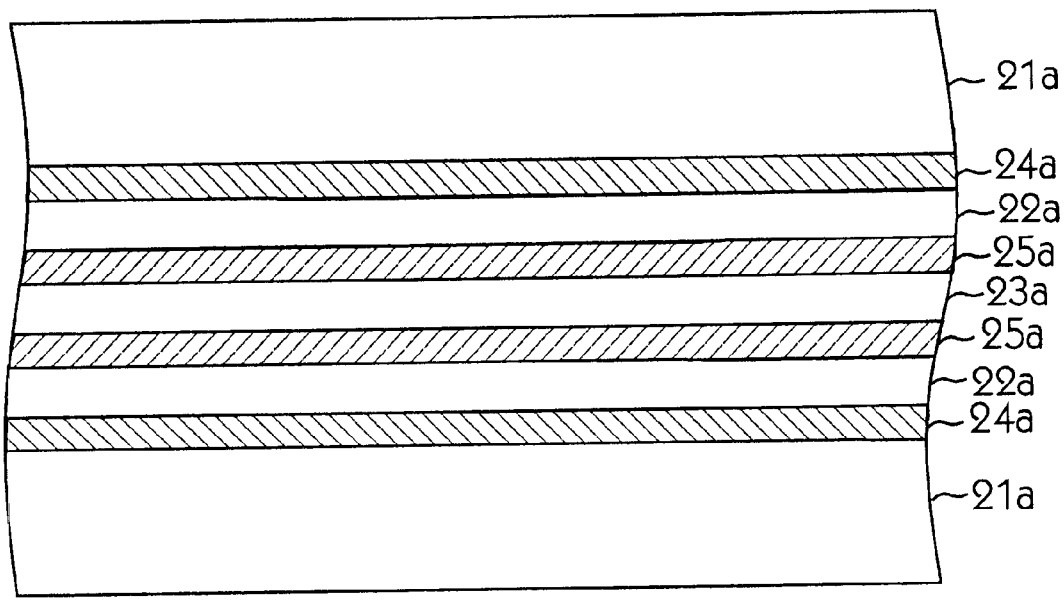
FIG. 2B illustratively depicts a longitudinal cross-section of a finished optical fiber preform according to the present invention.

FIG. 2B is a view illustrating a longitudinal cross-section of a finished optical fiber preform according to the present invention, and depicts substrate tube 21a, outer cladding layer 24a, middle cladding layer 22a, inner cladding layer 25a and core 23a. In the fabrication method of the preform, high-purity carrier gases including $SiCl_4$, $GeCl_4$, $POCl_3$, and $BCl_3$ and oxygen are injected into a glass substrate tube 21a. Then, the substrate tube 21a is heated so that a soot-like oxide is deposited on the inner surface of the tube 21a by thermal oxidation.

In the present invention, an outer cladding layer is formed by depositing a material having a low OH diffusion coefficient without using $P_2O_5$ with a large hygroscopicity, a middle cladding layer is formed by further doping a material which can reduce a process temperature and increase a deposition efficiency in consideration of thermal transfer characteristics and refractive index, and then an inner cladding layer is formed by depositing a material having a low OH diffusion coefficient without using $P_2O_5$ with a large hygroscopicity. A core layer for transmitting an optical signal is formed so that its refractive index increases toward the center of the core at a predetermined rate. Therefore, source gases are applied at a different composition for each deposited layer by controlling a mixing valve and a blocking valve.

In the deposition process, OH diffusion from the substrate tube 21a into the core layer 23a can be effectively prevented during core deposition, collapsing, or closing by depositing the inner and outer cladding layers 25a and 24a free of the OH-bridge material, $P_2O_5$. Therefore, loss caused by an OH-absorbing band in the core layer can be minimized while an optimal diameter (b/a) is kept. In addition, because the diameter ratio can be reduced, a process time can be decreased. Here, it is preferable that the ratio of the cladding layer diameter b to the core layer diameter a (b/a) is 1.1 to 3.0.

Meanwhile, self-collapse occurs due to internal surface tension when soot particles are glassified during sintering simultaneous with deposition. The existence of a buffer layer having a viscosity similar to that of a tube between a substrate tube with a high viscosity and a cladding layer with a relatively low viscosity can increases the deterrent power of the tube and reduce tube contraction.

In fabrication an optical fiber preform by MCVD, a shorter diameter ratio reduces an entire process time and is favorable for fabrication of a large-diameter preform. Since OH loss rapidly increases with a small diameter ratio, adversely influencing the quality of an optical fiber, the diameter ratio is about 3.0 in the prior art. However, OH absorption loss can be reduced and thermal stress-caused loss can be minimized when the diameter ratio is 3.0 or below, for example, between 1.1 and 3.0 according to the present invention.

In accordance with the optical fiber preform having an OH barrier and a fabrication method thereof according to the present invention, an outer OH barrier and an inner OH barrier free of $P_2O_5$ is are deposited between a substrate tube and a cladding layer and between the cladding layer and a core layer during deposition and the refractive index of the core layer increases toward the center of the core. Therefore, penetration of OH from the substrate tube into the core layer can be effectively prevented during core deposition, collapsing, or closing, and deterioration of optical characteristics caused by rapid drawing of the optical fiber can be also prevented.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber preform comprising:
    a substrate tube;
    a cladding layer inside the substrate tube;
    a core layer inside the cladding layer, said core layer having a refractive index greater than the refractive index of the cladding layer and having an increased value toward the center of the core; and
    a first barrier formed between the substrate tube and the cladding layer by depositing a material with a low OH diffusion coefficient, for preventing OH included in the substrate tube from penetrating into the cladding layer.

2. The optical fiber preform of claim 1, further comprising a second barrier formed between the cladding layer and the core layer by depositing a material with a low OH diffusion coefficient, for preventing OH included in the cladding layer from penetrating into the core layer.

3. The optical fiber preform of claim 1, wherein the first barrier is formed of a composition selected from $SiO_2$ and $SiO_2+GeO_2$.

4. The optical fiber preform of claim 2, wherein one of the first and second barriers is formed of a composition selected from $SiO_2$ and $SiO_2+GeO_2$.

5. The optical fiber preform of claim 1, wherein the first barrier has a refractive index not greater than the refractive index of either of the substrate tube and the core layer.

6. The optical fiber preform of claim 2, wherein one of the first and second barriers has a refractive index not greater than the refractive index of either of the substrate tube and the core layer.

7. The optical fiber preform of claim 1, wherein the diameter ratio of the cladding layer to the core layer is in the range of approximately 1.1 to 3.0.

8. The optical fiber preform of claim 1, wherein the refractive index at the periphery of the core layer is in the range of approximately 75 to 99% of the refractive index at the center of the core layer.

9. An optical fiber preform fabricating method, comprising the steps of:
    forming a first barrier by depositing a material with a low OH diffusion coefficient on the inner surface of a substrate tube; forming a cladding layer on the first barrier; and
    forming a core layer by deposition to have a refractive index increasing toward the center of the core layer, for transmitting an optical signal.

10. The method of claim 9, further comprising the step of forming a second barrier by depositing a material with a low OH diffusion coefficient between the cladding layer forming step and the core layer forming step.

11. The method of claim 9, wherein one of the first and second barriers is formed of a composition selected from $SiO_2$ and $SiO_2+GeO_2$.

12. The method of claim 10, wherein one of the first and second barriers is formed of a composition selected from $SiO_2$ and $SiO_2+GeO_2$.

13. An optical fiber preform, comprising:
    a cylindrical core, the refractive index of the core increasing smoothly from the periphery of the core to the center of the core;
    an inner cladding layer surrounding the core, said inner cladding layer comprising $SiO_2$ and being free of $P_2O_5$, the refractive index of said inner cladding layer being less than that of the core:

a middle cladding layer surrounding the inner cladding layer, said middle cladding layer comprising $SiO_2$ and $P_2O_5$, the refractive index of said middle cladding layer being less than that the core and approximately equal to that of said inner cladding layer;

an outer cladding layer surrounding the middle cladding layer, said outer cladding layer comprising $SiO_2$ and being free of $P_2O_5$, and the refractive index of said outer cladding layer being less than that of the core and approximately equal to that of said inner cladding layer; and a substrate tube surrounding the outer cladding layer, said substrate tube having a refractive index higher than those of said inner cladding layer, middle cladding layer and outer cladding layer.

14. The optical fiber preform of claim 13, said inner cladding layer further comprising $GeO_2$ for adjusting the refractive index of the inner cladding layer.

15. The optical fiber preform of claim 13, said outer cladding layer further comprising $GeO_2$ for adjusting the refractive index of the outer cladding layer.

16. The optical fiber preform of claim 13, the refractive index at the periphery of the core being in the range of 75 to 99% of the refractive index at the center of the core.

17. The optical fiber preform of claim 13, the ratio of the diameter of the outer cladding layer to the diameter of the core being in the range of approximately 1.1 to 3.0.

18. A method of manufacturing an optical fiber, comprising the steps of:

depositing, by modified chemical vapor deposition, an outer cladding deposition layer comprising $SiO_2$ and being free of $P_2O_5$ on the inner surface of a substrate tube, for producing an outer cladding layer of lower refractive index than the substrate tube;

depositing a middle cladding deposition layer comprising $SiO_2$ and $P_2O_5$ on the inner surface of the outer cladding deposition layer, for producing a middle cladding layer with refractive index approximately that of the outer cladding layer;

depositing an inner cladding deposition layer comprising $SiO_2$ and being free of $P_2O_5$ on the inner surface of the middle cladding deposition layer, for producing an inner cladding layer with refractive index approximately that of the outer cladding layer and middle cladding layer;

depositing a core deposition layer on the inner surface of the inner cladding layer, said core deposition layer having a varying composition from periphery to center, for producing a core having a refractive index higher than those of the outer cladding layer, middle cladding layer and inner cladding layer and having a refractive index increasing smoothly from the periphery of the core to the center of the core, for preventing optical loss due to thermal stress in the optical fiber; and collapsing the substrate tube with the deposited layers to form an optical fiber preform.

19. The method of claim 18, said step of depositing an outer cladding deposition layer further comprising depositing $GeO_2$ with the $SiO_2$, for controlling the refractive index of the outer cladding layer.

20. The method of claim 18, said step of depositing an inner cladding deposition layer further comprising depositing $GeO_2$ with the $SiO_2$, for controlling the refractive index of the inner cladding layer.

21. The method of claim 18, the ratio of the diameter of the outer cladding layer to the diameter of the core in the optical fiber preform being in the range of approximately 1.1 to 3.0.

22. The method of claim 18, the refractive index at the periphery of the core of the optical fiber preform being in the range of 75 to 99% of the refractive index at the center of the core.

23. The method of claim 18, further comprising the step of:

rapidly drawing the optical fiber preform to form an optical fiber.

* * * * *